L. V. BARTON & W. P. THOMPSON.
APPARATUS FOR MAKING WHITE LEAD.
APPLICATION FILED JAN. 3, 1914.
1,152,693.
Patented Sept. 7, 1915.
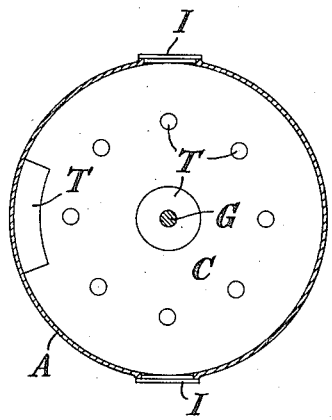
Fig. 3.
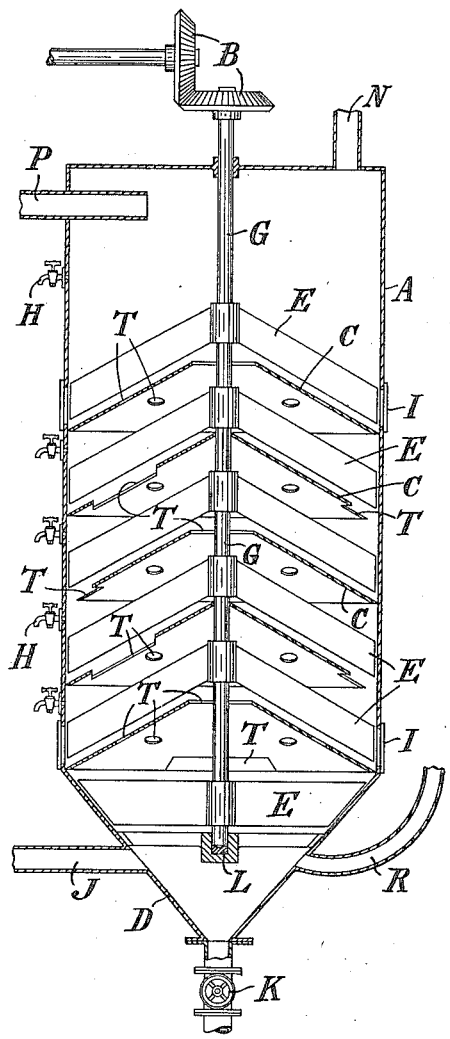
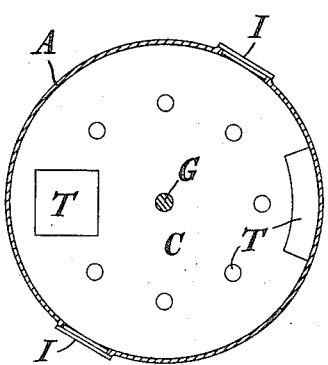
Fig. 2.
Fig. 1.

UNITED STATES PATENT OFFICE.

LIONEL VINCENT BARTON AND WILLIAM PHILLIPS THOMPSON, OF LIVERPOOL, ENGLAND.

APPARATUS FOR MAKING WHITE LEAD.

1,152,693.　　　　Specification of Letters Patent.　　Patented Sept. 7, 1915.

Application filed January 3, 1914.　Serial No. 810,207.

*To all whom it may concern:*

Be it known that we, LIONEL VINCENT BARTON and WILLIAM PHILLIPS THOMPSON, subjects of the King of Great Britain, residing at Liverpool, in the county of Lancaster, in the Kingdom of England, have invented certain new and useful Improvements in Apparatus for Making White Lead, of which the following is a specification.

In Barton's patent, No. 988963, a process and apparatus are set forth for making a very fine pure and non-fused monoxid of lead.

The present invention is designed for making white lead from such oxid.

Referring to the drawings:—Figure 1 is a vertical section of our apparatus; Fig. 2 and Fig. 3, plans of two of the diaphragms.

In these, A is a cylindrical chamber, having a series of diaphragms C C, and a conical bottom D.

E, E are a series of stirrers carried by a shaft G, a stirrer being arranged a slight distance above each diaphragm and one being placed in the upper part of the conical bottom D and extending nearly to the sides thereof. Shaft G is turned by any desired means such as bevel gear B.

H H are a series of pet-cocks, of which there can be any number, for examining the contents of the cylinder.

I, I are scraper holes or hand holes covered with a plate, one or more above each diaphragm, whereby the various diaphragms can be scraped from the outside if required.

J is the entrance for carbonic acid, K a blow-off cock, and L a step bearing for the shaft.

N is an exit for gases, P an exit for basic carbonate of lead and water, and R a pipe or opening through which the oxid of lead and water are introduced.

T, T designate holes in the diaphragms.

The mode of action is as follows:—The Barton oxid of lead and water, with a small percentage of acetic acid or acetate of lead or other like well known catalyte for the purposes of carbonating lead is passed into the still at R, carbonic acid is passed through at J, and the stirrers are rotated. The large bottom stirrer causes an agitation at the bottom, and the various other stirrers keep up this agitation all the way up to the top, while the constant or regulated inflow of material causes an upward current through the apparatus. The diaphragms have numerous holes, especially large ones alternately on each side of the apparatus, and as shown have a central orifice in three instances. The object of the holes at opposite sides alternately is to cause the main current to traverse from side to side of the apparatus before it can escape, instead of rising vertically. The oxid of lead being much heavier than basic carbonate, tends to fall to the bottom, but is continually stirred up by the large stirrers E, E. As it is carbonated, it rises through the devious passage caused by the diaphragms or obstructions, while any lumps or fine particles of oxid which rise with it pass back through the circumferential holes, and the smaller perforations. The basic carbonate with the water finally escapes out at the opening P, while the neutral gases which are usually mixed with the carbonic acid, escape out at the opening N.

In thus describing our invention, we do not bind ourselves at all to conical diaphragms. The diaphragms are preferably conical, so as to prevent deposits, nor do we confine ourselves to the exact number or arrangement shown, the main object of the invention being to give a very long circuitous passage from the bottom of the still to the top, and vigorously agitate it during the entire passage, the stirrers creating centrifugal action yet allowing the subsidence of any metallic lead or oxid thus separated which may be uncarbonated, the whole apparatus taking up a very small space.

We declare that what we claim is:—

1. In an apparatus for making white lead, the combination of a cylindrical chamber having a substantially vertical axis; a series of diaphragms having large perforations at the sides; means for passing carbonic acid, oxid of lead, water and a catalyte into the chamber near the bottom thereof; means for causing a rapid rotary current in the chamber; means for letting the waste gases, if any, escape at the top; and an exit pipe near the top for water and white lead.

2. In an apparatus for making white lead, the combination of a chamber having a substantially vertical axis; a series of conical, perforated diaphragms, each with one or more large passages or openings not coinciding vertically with the principal holes in adjacent diaphragms; means for passing carbonic acid, oxid of lead, water and a catalyte into the chamber near the bottom thereof; means for causing a rapid rotary current in the chamber; means for letting the waste gases, if any, escape at the top; and an exit pipe near the top for water and white lead.

3. In an apparatus for making white lead from oxid of lead, water, carbonic acid, and a catalyte, a chamber round in cross section; a series of conical diaphragms placed with their convex face uppermost; with means for causing a rapid circulation of the material; and means for allowing the heavy portions of the material to fall at the side to which it is carried by the centrifugal action set up in the apparatus.

4. In an apparatus for making white lead from oxid of lead, water, carbonic acid and a catalyte, a chamber round in cross-section having a conical bottom and a blow-off cock; a series of perforated diaphragms conical in form and placed with their convex face uppermost; a central shaft; and a stirrer attached thereto a little above each of the diaphragms.

5. In an apparatus for making white lead from oxid of lead, water, carbonic acid and a catalyte, a chamber round in cross-section; a series of diaphragms; a shaft and stirrer; a conical bottom for said chamber; a stirrer in the upper portion of the conical bottom and extending nearly to the sides of the same; and means for rotating the shaft so as to cause a vigorous circulation of the material being treated.

6. In apparatus for making white lead from oxid of lead, water, carbonic acid and a catalyte, the combination of a vertical cylinder having a settling space in the bottom thereof; a series of diaphragms conical in form, with their convex face uppermost and each having perforations at the side and also other perforations near the center thereof; a device for causing rotary motion in the contents throughout the cylinder except at the bottom thereof; and a cock for drawing off sediment, from time to time, from the bottom of the settling space in the cylinder.

In witness whereof, we have hereunto signed our names this 24th day of December, 1913, in the presence of two subscribing witnesses.

LIONEL VINCENT BARTON.
WILLIAM PHILLIPS THOMPSON.

Witnesses:
CHARLES LESLIE,
RICHARD W. WILLIAMS.